United States Patent [19]

Arav

[11] Patent Number: 4,543,977

[45] Date of Patent: Oct. 1, 1985

[54] VALVES

[75] Inventor: Ronnie A. Arav, Bolton, England

[73] Assignee: Beloit Corporation, Beloit, Wis.

[21] Appl. No.: 545,892

[22] Filed: Oct. 27, 1983

[30] Foreign Application Priority Data

Oct. 30, 1982 [GB] United Kingdom ............... 8230926

[51] Int. Cl.[4] ........................................... G05D 16/18
[52] U.S. Cl. .................................. 137/115; 92/85 B;
137/87; 251/50; 251/205
[58] Field of Search ................. 137/87, 100, 112, 114,
137/115, 111, 113; 251/205, 50; 92/85 B

[56] References Cited

U.S. PATENT DOCUMENTS

| | | | |
|---|---|---|---|
| 845,827 | 3/1907 | Steedman | 92/85 B |
| 1,129,964 | 3/1915 | Ebeling | 92/85 B |
| 2,526,361 | 10/1950 | Johnson | 251/205 X |
| 2,870,776 | 1/1959 | Marsh | 137/115 X |
| 2,916,019 | 12/1959 | Murphy | 137/625.65 |
| 3,120,854 | 2/1964 | Shimooka | 137/98 |
| 3,434,286 | 3/1969 | Raizes | 137/112 X |

Primary Examiner—Robert G. Nilson
Attorney, Agent, or Firm—Dirk J. Veneman; Gerald A. Mathews; Raymond W. Campbell

[57] ABSTRACT

A balance valve for maintaining two fluid pressure systems at a predetermined pressure relative to one another. The valve comprises a piston slidably received within a bore and subjected on opposite ends to the pressure in the two systems. Each of the two systems is provided with a relief line whose communication with the associated system is controlled by movement of the piston such that any imbalance of forces acting on the piston causes the appropriate relief line to be opened to balance out the forces. The ports controlled by the piston and communicating with the relief lines are triangular in shape. In one embodiment a respective spring acts on each end of the piston to determine the relative pressure levels in the two systems. In another embodiment means is provided to resist movement of the piston in response to rapid pressure fluctuations.

1 Claim, 5 Drawing Figures

VALVES

DESCRIPTION

The present invention relates to a valve, in particular, a balance valve for controlling the relative pressure in two separate systems.

An object of the invention is to provide a valve which will maintain the pressure in two separate systems at a predetermined pressure relative to one another without mixing the fluids contained in the two separate systems.

According to the present invention there is provided a balance valve for maintaining two fluid pressure systems at a predetermined pressure relative to one another, the valve comprising a valve body having a bore which receives a piston whose opposite ends are subjected to the fluid pressure in first and second fluid pressure systems, which systems are isolated from one another by the piston, each of the fluid pressure systems being provided with a relief line passage whose connection with its associated fluid pressure system is controlled by movement of the piston; any imbalance of forces acting on the piston causes it to be displaced in a direction to connect the fluid pressure system associated with that side of the piston subjected to the higher force to its relief line to thereby effect a reduction in fluid pressure acting on that side of the piston to balance out the forces acting on the piston.

In one embodiment the balance valve is arranged to maintain the pressures in the two systems substantially equal. Thus, if a higher pressure exists in say the first system than in the second system, the piston will be displaced to connect the first system to its relief line allowing fluid to flow off until the pressures are equalised when the relief connection will be closed off. The piston carries sealing members to prevent the fluid of the first system mixing with the fluid of the second system.

In the preferred embodiment the piston is acted on, at opposite ends by two springs. The force exerted by the springs on the piston may be equal in which case the valve serves to equalise the pressure in the two systems. Alternatively, the springs may be arranged to exert different pressures in which case the valve serves to maintain a differential pressure between the two systems.

Means is preferably provided to resist rapid movement of the piston in either direction. The means comprises a plunger movable in a blind bore, and an orifice which restricts the flow of fluid from the blind bore on introduction of the plunger into the bore. The amount of resistance can be changed by using different sized orifices. Each end of the piston is provided with such means.

A still further feature of the invention resides in the shape of the port which leads from the bore in the valve body to the relief line. This is preferably triangular in shape, such that initial movement of the piston uncovers only a small opening whilst further movement uncovers a progressively larger area in relation to the distance travelled.

The present invention will not be described further, by way of example only, with reference to the accompanying drawings, in which.

Figure 1:
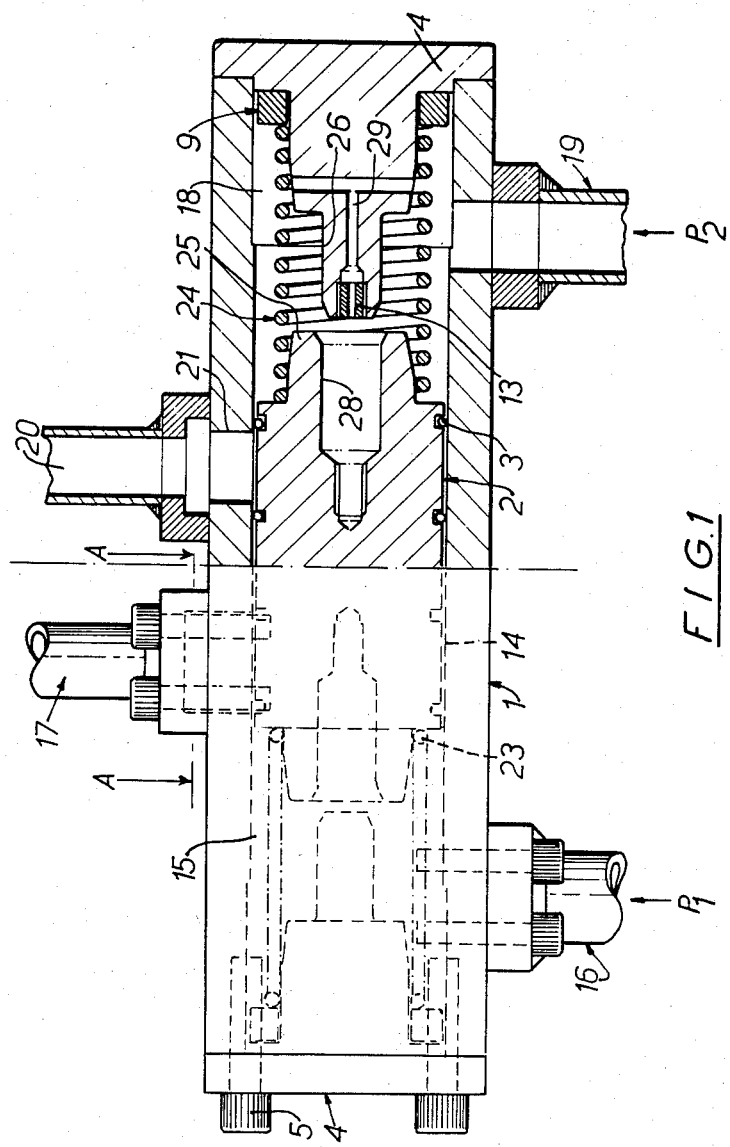
FIG. 1 illustrates a half-section of a balance valve according to the present invention.
Figure 5:
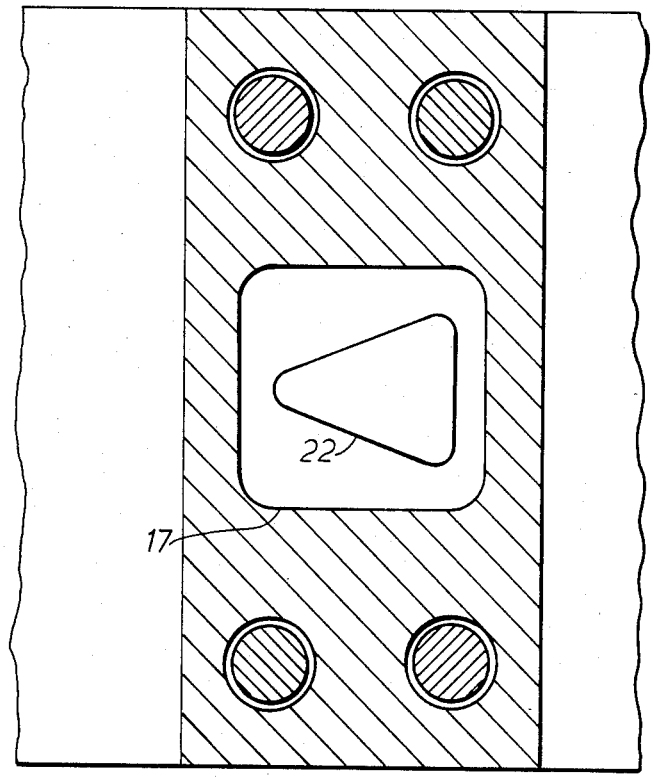
FIG. 5 is a section on AA of FIG. 1.

Referring to the drawing of FIG. 1 there is shown a balance valve having a body 1 with a cylindrical bore 14 in which is received a piston 2. The bore in the valve body is closed off at each end by blanking plates 4 secured in position by bolts 5. The piston 2 carries sealing members 3 which isolate first and second fluid pressure systems from one another. One end of the piston 2 defines in part a first fluid chamber 15 which is fed with fluid under pressure by way of a connection 16. A relief line 17 opens into the bore 14. Similarly the other end of the piston defines in part a second chamber 18, forming part of the second fluid pressure system, and connected thereto by way of a line 19. A second relief line 20 opens into the bore 14 at a port 21. FIG. 5 shows a section on AA of FIG. 1 and illustrates that the port 22 of the first relief line 17 is triangular in shape. The port 21 is similarly shaped and in both cases the narrow end of the port is disposed adjacent to the end of the piston.

The valve body accommodates two springs 23, 24 and as illustrated in FIG. 1 the spring 23 is disposed between the end plate 4 and the left hand end of the piston 3 whilst the spring 24 is disposed between the right hand end of the piston 3 and the right hand end plate 4. Each of the piston 3 is provided with a projecting nose 25 which serves to locate the repsective spring coaxially thereof. Each of the end plates 4 has a stepped portion, a projection 26 of which is adapted to be received in a respective blind bore 28 formed in the nose 25 of the piston. The projection 26 is dimensioned to be a close tolerance fit in the bore 28. A passage 29 leads from the end of the projection 26 and communicates with the chamber 18. An annular sleeve 13 is inserted into the passage 29 and serves as a throttle the function of which will be described further hereinbelow. It will be appreciated that the projection 26 could be formed on the piston 2 and the bore 28 formed in the end plate 4.

It will be seen from FIG. 1 that the valve is symmetrical in its construction with the left hand half being a mirror image of the right hand half. The valve is illustrated in FIG. 1 in its equilibrium position in which the forces acting on the piston 2 are balanced. The force acting on the left hand end of the piston 2 is made up of the spring force plus the fluid pressure P1 in the first fluid pressure system. The right hand end of the piston 2 is subject to the force of the spring 24 and the pressure P2 in the second fluid pressure system. Thus, where the spring forces are equal the piston will adopt the position illustrated when pressures P1 and P2 are also equal. If the pressure rises in fluid chamber 15 the piston 2 will be displaced to the right and the seal member 13 will uncover the port 22 leading to the relief line 17. Fluid will flow off from the first fluid system until the pressure in the first system is substantially equal to the pressure in the second system whereupon the piston will move back to close off the port 22 under the influence of the spring 24. If the pressure were to drop in chamber 18 then the same movement would occur. If the pressure were to rise in chamber 18 then the piston would move to the left and fluid would be drained from the second system by way of the relief line 20. The relief lines 17 and 20 are connected to respective reservoirs which feed the two systems and these reservoirs will operate at a lower pressure than the higher pressure side which is being controlled. Typically the reservoirs are at atmospheric pressure.

It will be seen that when the piston moves to the right, as illustrated in FIG. 1, the projection 26 enters the blind bore 28 and movement of the piston is resisted because fluid cannot freely escape from the bore 28. The resistance offered is dependent on the size of the orifice 13 and the closeness of fit between the projection 26 and the bore 28. The resistance to movement can be changed by using different sizes of orifice in the throttle 13. As an alternative it is envisaged that needle valves can be used instead of the fixed orifices to allow the user to change easily the shock absorbing characteristics of the valve.

If the springs 23 and 24 exert equal forces on the piston in the position illustrated in FIG. 1 then the pressures P1 and P2 would be maintained substantially equal. If each of the springs 23 and 24 has a different spring characteristic, or if only one spring is included in the valve the pressures P1 and P2 in the two fluid systems can be maintained at a prefixed differential level without mixing of the fluids in the two systems. Thus the balance valve in this case acts as a differential pressure control valve.

Figure 2:
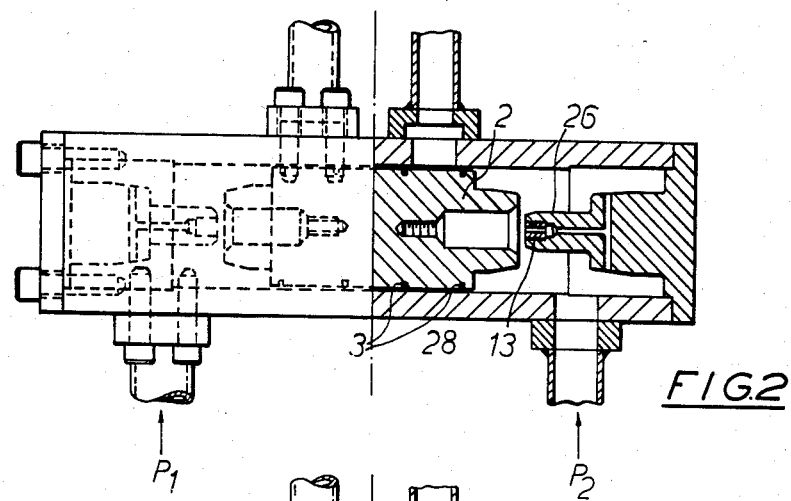
FIGS. 2 to 4 are half-sections drawn to a reduced scale of three modified embodiments of a balance valve according to the invention.
Figure 3:
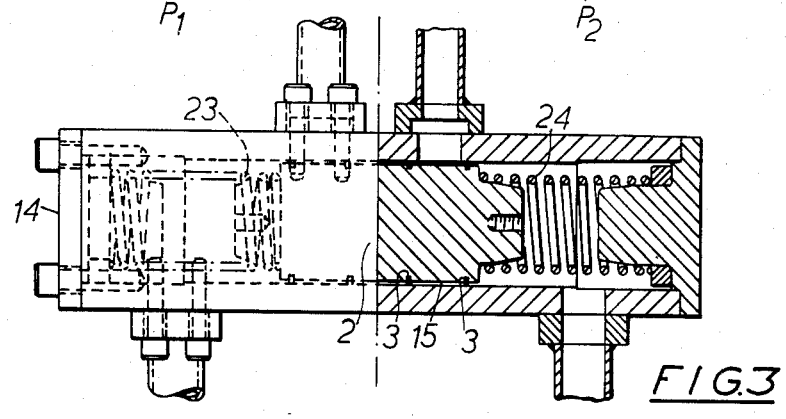
Figure 4:
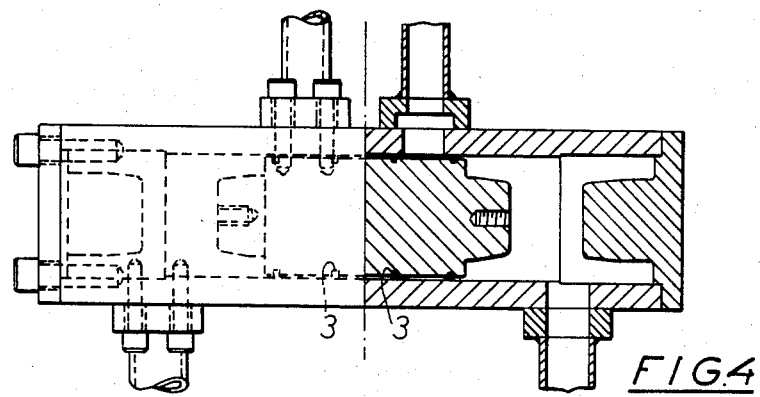

FIGS. 2, 3 and 4 show three modified valve arrangements. In the embodiment of FIG. 2 the springs 23 and 24 of FIG. 1 have been removed so that the valve controls the pressure to a zero differential condition. That is to say the piston will move as soon as there is any variation between the pressures P1 and P2, there being no spring pressure to overcome. The shock absorbing feature i.e. projection 26, bore 28 and throttle 13 are retained and this stops the piston 2 from shuttling rapidly from one side to the other. The ability to respond to quick pressure change will depend upon the size of the orifice in the throttle 13.

In the embodiment of FIG. 3 the shock absorber has been omitted so that the valve responds quickly to pressure changes. The movement of the piston 2 is still controlled by the springs 23, 24 on both sides so that there is still some differential pressure between the systems while their pressures are controlled. A constant differential pressure can be maintained between the two systems by employing springs 23, 24 of different characteristics or by omitting one of the springs.

In the embodiment of FIG. 4 both the springs 23, 24 and the shock absorbers are omitted. With this arrangement the valve will give immediate response to the slightest pressure differential and will control the pressures to become exactly equal. With this system the piston will be in continous movement from side to side.

In all cases the fluid of the first system is prevented from mixing with the fluid of the second system by the provision of the seals 13 carried by the piston 2.

The valve has the advantage that it is uncomplicated and built from a few parts. The large sizes of the pressure and drain ports reduce the possibility of blockage and the valve can be adapted to suit a large range of working conditions by changing the springs and shock absorbers or shape and size of the drain ports.

One application of the valve is in paper making machinery where the valve can be placed between the high pressure hydraulic line connected to the C.C. (i.e. Controlled Crown) roll piston chamber and the high pressure hydraulic line connected to the E.N.P (i.e. Extended Nip Press) piston chamber. The valve functions to maintain these two pressure lines at the same pressure without mixing the E.N.P. water contaminated oil with the C.C. roll oil which has the function of lubricating the C.C. roll bearings.

In an alternative construction the piston is modified to allow the relief lines 17, 20 to be moved outwardly i.e. away from one another so that the piston can be provided with a seal, for isolating the two systems, which does not cross the ports during operation. The seal is preferably disposed mid way between the ends of the piston.

I claim:

1. In a balance valve for maintaining two fluid pressure systems at a predetermined pressure relative to one another, including a valve body with a piston bore, a piston received in the bore for reciprocal movement therein, the piston being subjected at opposite ends to the fluid pressure in the first and second fluid pressure systems, which systems are isolated from one another by the piston, and a relief line for each of the fluid pressure systems, the combination comprising:

each relief line is linked in fluid communication with the piston bore such that each relief line is closed when the piston is substantially centered in operating position;

means associated with the piston at each end thereof, including a cushioning bore in either end of the piston and a complimentary plunger at either end of the valve extending inwardly in the piston bore, providing restricted fluid communication between the respective cushioning bores and the piston bore at either end of the piston as the piston reciprocates and fluid in the cushioning bore opposite the incoming plunger cushions the piston motion as the fluid passes in a restricted manner to the piston bore;

a control oriface disposed within a passageway leading from the end of each plunger to its respective piston bore whereby fluid flowing out of the cushioning bore upon entry of its respective plunger is forced through the control oriface to thereby throttle the fluid flow therethrough and cushion the travel of the piston;

a spring disposed at either end of the valve to position the piston within the piston bore at a predetermined position to regulate the fluid pressure in the first and second fluid pressure systems relative to one another as well as to return the piston to such position after its movement caused by a pressure differential in the fluid pressure system;

whereby any imbalance in the forces in the fluid pressure systems acting on the piston causes the piston to move away from the higher force and thereby connect the relief line associated with the higher fluid pressure end of the piston bore to thereby effect reduction in the fluid pressure acting on that side of the piston to balance out the forces acting on the piston.

* * * * *